United States Patent [19]
Bell et al.

[11] Patent Number: 5,466,357
[45] Date of Patent: Nov. 14, 1995

[54] ELECTROPOLYMERIZATION METHOD AND PRODUCT

[75] Inventors: James P. Bell, Storrs, Conn.; Jude O. Iroh, Cincinnati, Ohio; Daniel A. Scola, Glastonbury, Conn.; Jengli Liang, Auburn, Ala.

[73] Assignee: The University of Connecticut, Storrs, Conn.

[21] Appl. No.: 80,674

[22] Filed: Jun. 22, 1993

Related U.S. Application Data

[62] Division of Ser. No. 898,911, Jun. 12, 1992, Pat. No. 5,232,560, is a continuation of Ser. No. 947,367, Sep. 18, 1992, Pat. No. 5,238,542, which is a continuation of Ser. No. 665,943, Mar. 5, 1991, abandoned, said Ser. No. 898,911, is a continuation of Ser. No. 366,933, Jun. 19, 1989, abandoned.

[51] Int. Cl.$^6$ .................................................... C25B 3/00
[52] U.S. Cl. .............................. 205/50; 204/72; 428/626; 428/457; 428/458
[58] Field of Search .............................. 204/72; 205/50; 428/626, 457, 458

[56] References Cited

PUBLICATIONS

Subramanian et al. "Electropolymerization on Graphite Fibers", Polymer Eng. & Science, vol. 18, No. 7, May 1978, pp. 590–600.

*Primary Examiner*—John Niebling
*Assistant Examiner*—Kishor Mayekar
*Attorney, Agent, or Firm*—Fishman, Dionne & Cantor

[57] ABSTRACT

In accordance with the present invention, electropolymerization in a substantially aqueous solution is used to form thick (e.g. greater than 2 microns or 30 weight %) and thermally stable coatings of thermoplastic materials onto electrically conductive filler materials (e.g. rods, plates, fibers). In a first preferred embodiment, the thick thermoplastic matrix comprises a copolymer of 3-carboxyphenyl maleimide and styrene. In a second preferred embodiment, cyclic (and preferably aromatic) N-substituted methacrylamide monomers are electropolymerized onto electrically conductive (e.g., graphite) filler (e.g., fibers, plates, film or cloth) to form a novel polymer composite exhibiting high Tg as well as a controlled degree of cross-linking which can prevent flow at high temperature. This invention is particularly well suited for direct preparation of thermoplastic prepregs containing commercially available bundles of graphite fibers. These prepregs are then molded under heat and pressure so as to form a thermoplastic matrix composite with good fiber distribution, uniformity and high temperature resistance.

22 Claims, 8 Drawing Sheets

ELECTROPOLYMERIZATION METHOD AND PRODUCT

CROSS-REFERENCE TO RELATED APPLICATIONS

This is a divisional of U.S. application Ser. No. 07/898,911 filed Jun. 12, 1992 (now U.S. Pat. No. 5,232,560) which was a continuation of application Ser. No. 366,933 filed Jun. 19, 1989 now abandoned and this is a divisional of application Ser. No. 947,367 filed Sep. 18, 1992 (now U.S. Pat. No. 5,238,562) which was a continuation of application Ser. No. 665,943 filed Mar. 5, 1991, now abandoned.

BACKGROUND OF THE INVENTION

This invention relates to a method of forming thermoplastic composites using electro-polymerization in a predominately aqueous solution. More particularly, this invention relates to the formation of thick and thermally stable uniform coatings of thermoplastic materials onto the surface of conductive filler materials. This invention specifically relates in a first embodiment to the formation of a copolymer of 3-carboxyphenyl maleimide and styrene as a thick coating on a suitable conductive material such as graphite fibers using electro copolymerization techniques. In a second embodiment, this invention relates to the formation of high glass transition temperature polymer coatings onto the surface of conductive filler materials (such as graphite fibers) wherein the polymer is derived from cyclic N-substituted methacrylamide monomers. This invention provides an electropolymerized polymer composite which is processible as a thermoplastic, but undergoes a crosslinking step upon heat curing so as to exhibit thermoset properties such as high strength, high glass transition and high resistance to flow and solvents.

High performance resins with a good long term environmental stability over a wide range of temperature and with damage tolerance are currently in great demand, particularly in aerospace applications. These resins are typically needed in the manufacture of composite materials which require the properties of high strength and low weight. Thermosetting resins such as epoxy systems are the most widely used matrix resins for such advanced composites. Unfortunately, they generally possess insufficient hot/wet properties and temperature resistance. An exception to this generality is bismaleimide polymers since they are stable at elevated temperature (approximately 200° C.) and have good hot/wet properties. The problem with such systems is that the processing times are relatively long and there is no resin flow after the cure reaction is completed. Greater toughness and impact resistance are also highly desirable.

These problems have heightened the search for alternative thermoplastic materials for use as matrices for advanced composites. Advantageous features of thermoplastic matrices include high toughness, easy processibility, long shelf life and potential for high volume processing resulting in low cost per part. However, the difficulty in preparation of prepregs from high viscosity thermoplastic resins and the problem of wetting all the individual fibers in a fiber bundle as well as the problem associated with polymer solubility and solvent removal limit the efficacy of use of thermoplastics in advanced composites.

Electropolymerization has been used in the direct formation of polymers onto electrode surfaces such as graphite fibers. Such polymerizations have generally been from nonaqueous solutions, by ionic or mixed ionic-radical mechanism. However, molecular weights of the electropolymers from these solutions have generally been low.

More recently, aqueous solution electropolymerization techniques have been disclosed to apply thin (less than ten (10) weight % polymer) polymeric coating onto graphite fibers. See Bell et al, *Polymer Composites*, 8,46 (1987), Subramanian et al, *Polymer Engr. Sci.*, 18,590 (1978). Unfortunately, such thin deposition of thermoplastic polymers onto graphite fibers does not satisfy the need for new thermoplastic composite materials since the thin coatings are incapable of forming the required thick thermoplastic matrix needed in such composites.

Experimental work is known with regard to the electropolymerization of acrylamide monomers (see M. Cvetkovskaja, T. Grcev, L. Arsov and G. Petrov, Kem. Ind. 34, 235 (1985) and J. R. MacCallum and D. H. MacKerron, *The Electropolymerization of Acrylamide on Carbon Fibres*, British Polymer Journal, Vol. 14, March 1982, pp. 14–18). However, the electropolymerized polyacrylamide composites described in the prior literature suffer from certain disadvantages and deficiencies including high water absorption, low temperature resistance, high solubility rates in water and thin polyacrylamide coatings on fillers such as graphite fibers.

SUMMARY OF THE INVENTION

The above-discussed and other problems and deficiencies of the prior art are overcome or alleviated by the electropolymerization method and composite product of the present invention. In accordance with the present invention, electropolymerization in a substantially aqueous solution is used to form thick (e.g. greater than 2 microns or 30 weight %) and thermally stable coatings of thermoplastic materials onto electrically conductive materials (e.g. rods, plates, fibers).

In a preferred embodiment, the thick thermoplastic matrix comprises a copolymer of 3-carboxyphenyl maleimide (3-CMI) and styrene. Also disclosed are thermoplastic matrices comprised of glycidyl acrylate/methyl acrylate copolymer as well as certain other thermoplastic polymers and copolymers.

This invention is particularly well suited for direct preparation of thermoplastic prepregs containing commercially available bundles of graphite fibers. These prepregs are then molded under heat and pressure so as to form a thermoplastic matrix composite with good fiber distribution, uniformity and high temperature resistance. This final product is a marked improvement over prior art methods of forming thermoplastic composites due to the highly viscous nature of thermoplastic resins which made uniform flow into fiber bundles and wetting of the individual fibers extremely difficult. The method of this invention is also a marked improvement over prior art solvent coating processes which have met limited success because high temperature engineering thermoplastics have very low solubility and because removal and handling of the required exotic solvents is problematic.

The thick coatings (greater than thirty (30) weight %) obtained using the process of the present invention are surprising and unexpected because thermoplastics are good electrical insulators and as the coating layer builds, one would expect the reaction to slow and eventually end due to electrical resistance. Thus, the present invention was unexpected despite the disclosures described above regarding the formation of thin (less than ten (10) weight %) coatings.

In accordance with still another embodiment of the present invention, cyclic (and preferably aromatic) N-substituted methacrylamide monomers are electropolymerized onto electrically conductive (e.g., graphite) filler (e.g., fibers or plates) to form a novel polymer composite exhibiting high Tg as well as a controlled degree of cross-linking which can prevent flow at high temperature. This latter feature of this invention (e.g., controlled cross-linking) provides particularly important advantages to this invention in that the initially formed polymer will behave and be processable as a thermoplastic and so may be termed a prepreg. Thereafter, however, the composite may go through a post cure (or post fabrication) stage where a crosslinking reaction takes place in the polymer matrix. This crosslinking will increase with each heating and cooling cycle so that the resultant composite will behave as a thermoset with a controlled degree of crosslinking (dependent in part on the number of heating/cooling cycles). Thus, the polymer composite of this invention includes the benefits of both thermosetting and thermoplastic systems obtained by controlling the degree of crosslinking.

The monomers used in the composite of this invention may comprise one or more cyclic N-substituted methacrylamide monomers. In addition, the polymer may include other monomers such as methyl methacrylate derivatives for tailoring the composite properties (e.g., water absorption or enhancing the rate of polymerization).

It will be appreciated that the crosslinking and imide formation reactions associated with this invention were not possible in the simple acrylamide compositions of the prior art such as described in the MacCallum and MacKerron article cited above.

The above discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
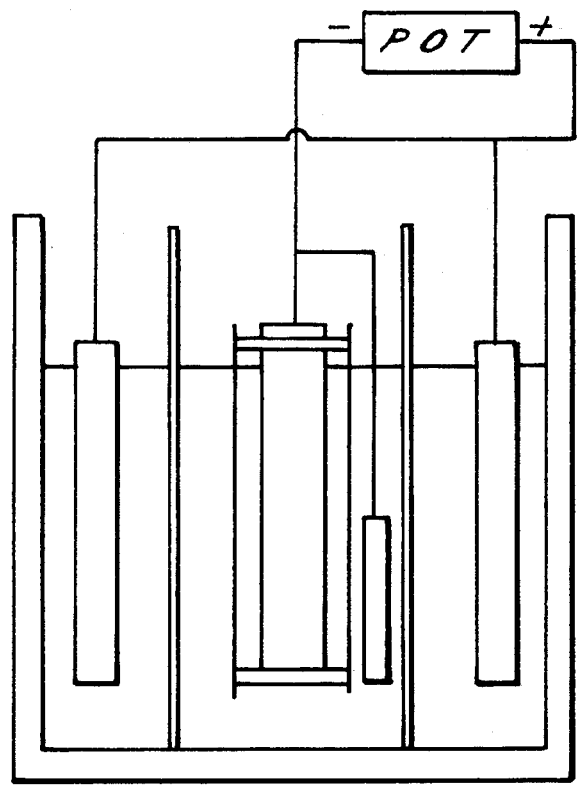
FIG. 1 is a schematic representation of an electrochemical cell.

This invention relates to a process of forming polymer matrix composites wherein the polymer matrix is a thermoplastic and the composite filler includes at least one electrically conductive filler such as graphite. The process utilizes the technique of electropolymerization of thermoplastic monomers in a substantially aqueous solution to form thick and uniform coatings of greater than about two (2) microns or greater than about 30 weight percent polymer coating.

An important feature of this invention is the inclusion of a small amount of organic solvent in the aqueous solution. The organic solvent may include, for example, dimethylacetamide, dimethylsulfoxide, tetrahydrofuran or dimethylformamide. The aqueous solution preferably includes sulfuric acid as an electrolyte although other electrolytes such as ascetic acid may be used.

The monomers used in conjunction with the present invention include any unsaturated monomer that is moderately soluble in an aqueous/organic system and is permeable to the ions diffusing in the electro-chemical process. Such monomers include, but are not limited to hydroxymethylmethacrylate, vinyl carbazole, maleimide, N-ethylmaleimide, 3-carboxyphenyl maleimide, styrene, bismaleimide, cyclohexane, cyclopentadiene, N-phenyl nadimide, and acetylene terminated monomers.

The themoplastic monomers are electropolymerized onto any suitable electrically conductive material including but not limited to graphite or metal plates, rods, fibers, particles, metal or graphite coated fibers or woven or non-woven conductive webs.

The present invention will now be more particularly described with respect to the formation of thermoplastic matrix composites formed by the electropolymerization of styrene/3-carboxyphenyl maleimide copolymer, glycidyl acrylate/methyl acrylate copolymers and a plurality of other polymer and copolymer composites onto graphite fiber bundles. However, it will be appreciated that the present invention is not limited to these particular polymer and copolymer composites and generally includes the electropolymerized formation of thermoplastic matrix composites wherein the filler includes electrically conductive material such as metal plates, rods, fibers, particles and the like as described above.

As described more fully in the following example, a novel copolymer of styrene and 3-carboxyphenyl maleimide (3-CMI) exhibiting an alternating structure shown below is derived from the method of the present invention;

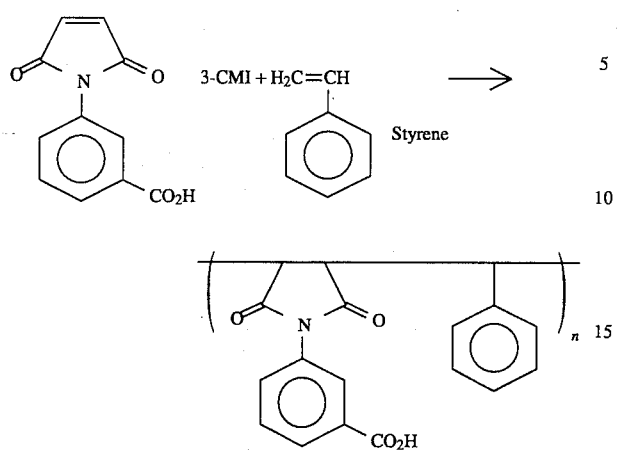

where n is greater than 25.

EXAMPLE 1

Materials

Monometric styrene (99.9%) purchased from Aldrich Chemical Company, was extracted twice in 10% sodium hydroxide solution to remove inhibitor and washed twice in distilled water. 3-Carboxyphenyl maleimide (3-CMI), was purchased from Mitsui Toatsu Chemicals Inc., of Japan and was used as received. Laboratory grade sulfuric acid, 96% from May and Baker Ltd., was diluted to 0.0125M by adding distilled water and was then used as the supporting electrolyte. High purity dimethylacetamide (DMAc) (99.9%) was used as purchased from Aldrich Chemical Company. Unsized AS-4 graphite fibers (7.2 micron diameter, 3000 filament bundle) from Hercules Inc., wound onto an H-shaped 6"×6" aluminum frame was used as the working electrode.

Electrocopolymerization

Electrocopolymerization of 3-carboxyphenyl maleimide and styrene was carried out in the middle compartment of a 3-chamber polypropylene cell. A schematic representation of the cell is shown in FIG. 1 wherein Item 1 is the working electrode, Item 2 is the counter electrode, Item 3 is the Standard Calomel (SCE) reference electrode and Item 4 is a polypropylene membrane. The central compartment contains the monomer-electrolyte solution, composed of 3-carboxyphenyl maleimide (0.5M), styrene (0.5M), DMAc and sulfuric acid (0.0125M) in the volume ratio 50:50:20:100. It is separated from the two side compartments by a polypropylene membrane (0.04 micron pore diameter), glued to perforated polypropylene sheets. The side chambers contain the supporting electrolyte and two rectangular stainless steel (8"× 8"×1/16") counter electrodes. Other counter electrodes may also be used. Initiation of copolymerization was achieved by constant current polymerization. The current density applied ranged from 2–35 milliamperes and the electrocopolymerization time was varied to give the thickness of coating desired. Electropolymerized materials precipitated onto the surfaces of the graphite fiber cathode and were removed by withdrawing the frames from the cell. The coated fibers were rinsed in distilled water, dried at 200° C. for 12 hours under vacuum and weighed to determine the amount of copolymer formed. It was found that 12 hours at 200° C. under vacuum was sufficient to bring the prepregs to constant weight. The molecular weight distribution of the copolymer synthesized from a 0.5M (1:1) comonomer feed solution was determined by Waters gel permeation chromatograph. Tetrahydrofuran (THF), and monodispersed polystryene were the solvent and calibration standards respectively.

Characterization

Thermal analysis of the copolymer was accomplished on a dupont 9900 series differential scanning calorimeter and thermogravimetric analyzer operated at 10° C./min under a nitrogen atmosphere. Functional group and copolymer compositional analysis was done by use of a Nicolet FTIR spectrophotometer. KBr pellets were used. For calculation of the copolymer composition, a calibration curve for imide ($1710\ CM^{-1}$) to styrene ($2923\ CM^{-1}$) peak area absorption ratio against the imide-styrene mole composition was constructed, using blends of bulk polymerized polystryene and poly(3-carboxyphenyl maleimide).

Results and Discussion

Aspects of Electrocopolymerization

Figure 2:
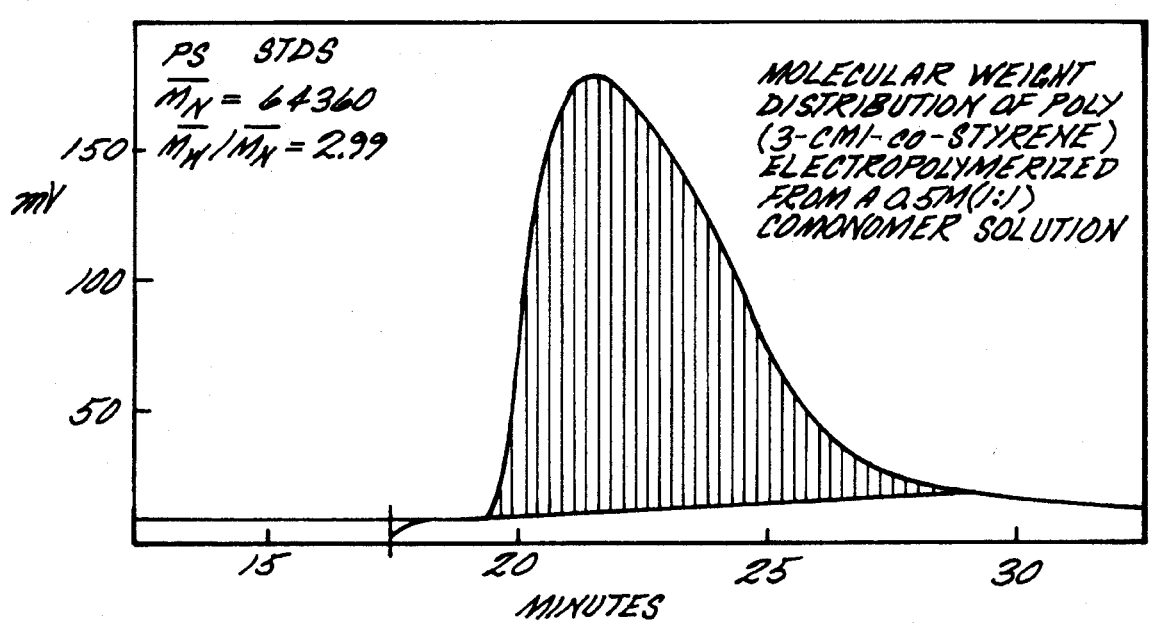
FIG. 2 is a graph showing molecular weight distribution of poly(3-CMI-co-Styrene) electrocopolymerized from a 0.5M (1:1) comonomer solution.

Neither of the individual comonomers would homopolymerize without current flow under the experimental conditions adopted. Also copolymerization did not take place without current. However, when a current density of about 10 mA per gram of fiber was passed through a solution of styrene (0.5M), 3-CMI (0.5M), DMAc and sulfuric acid (0.0125M), present in the volume ratio 50:50:20:100, respectively, copolymer coatings on the graphite fiber cathode surface occurred almost immediately. A preliminary molecular weight estimate (FIG. 2) indicates a polydispersity index $\overline{Mw}/\overline{Mn}=3$ and a moderately high number average molecular weight, $\overline{Mn}=64000$, consistent with radical copolymerization. The molecular weight is an estimate only, since it was assumed that the same calibration was applicable for the copolymer as for a series of known polystyrene calibration standards.

Thermal Analysis

Figure 3:
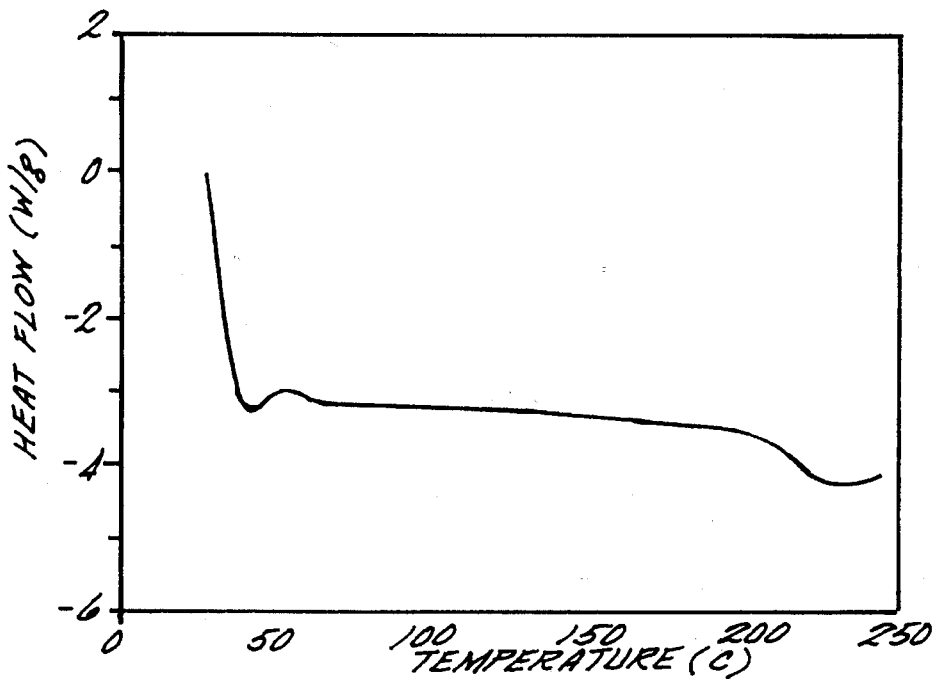
FIG. 3 is a DSC thermogram of electropolymerized (1:1) copolymer.
Figure 4:
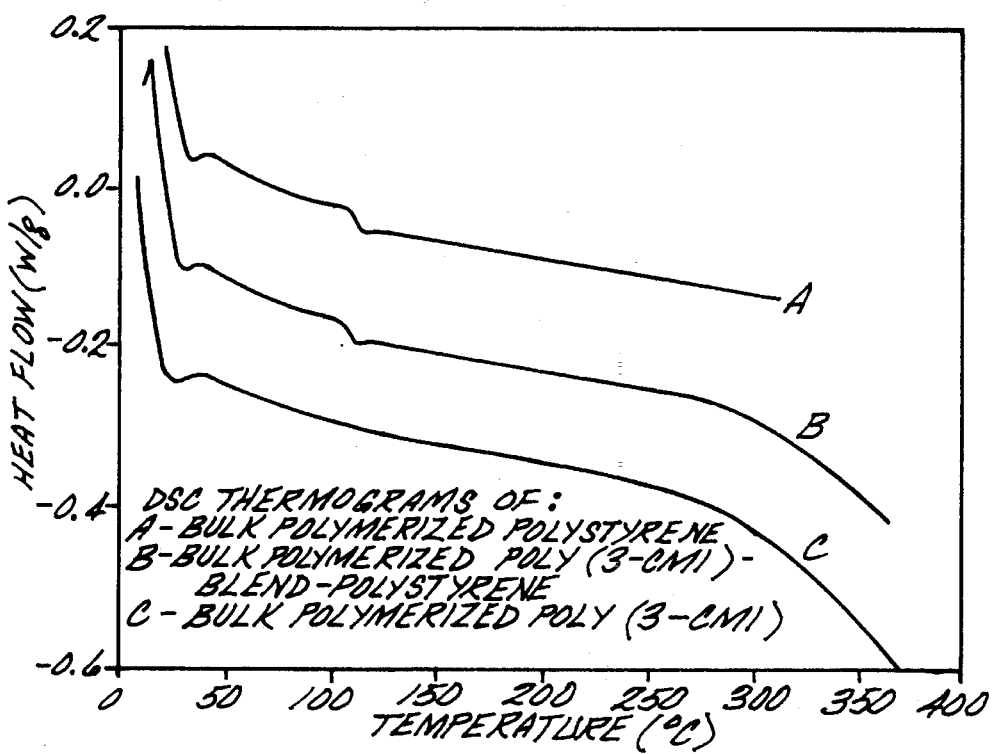
FIG. 4 are DSC thermograms of: A) bulk polymerized polystyrene, B) bulk polymerized poly(3-CMI)-blend-polystyrene, C) bulk polymerized poly(3-CMI)

FIG. 3 shows a typical DSC thermogram of the copolymer synthesized from a 0.5M(1:1) comonomer feed solution. Variation of the glass transition temperature of copolymers made using different styrene comonomer feed compositions is shown in Table 1. The electrocopolymerized samples show only one glass transition temperature, (e.g., approximately 210° C.) which remained relatively unchanged for samples synthesized from different comonomer feed composition. The DSC thermograms for free radical bulk polymerized polystyrene, poly(3-CMI), and a 1:1 poly(styrene-blend-3-CMI) are shown on FIG. 4.

Figure 5:
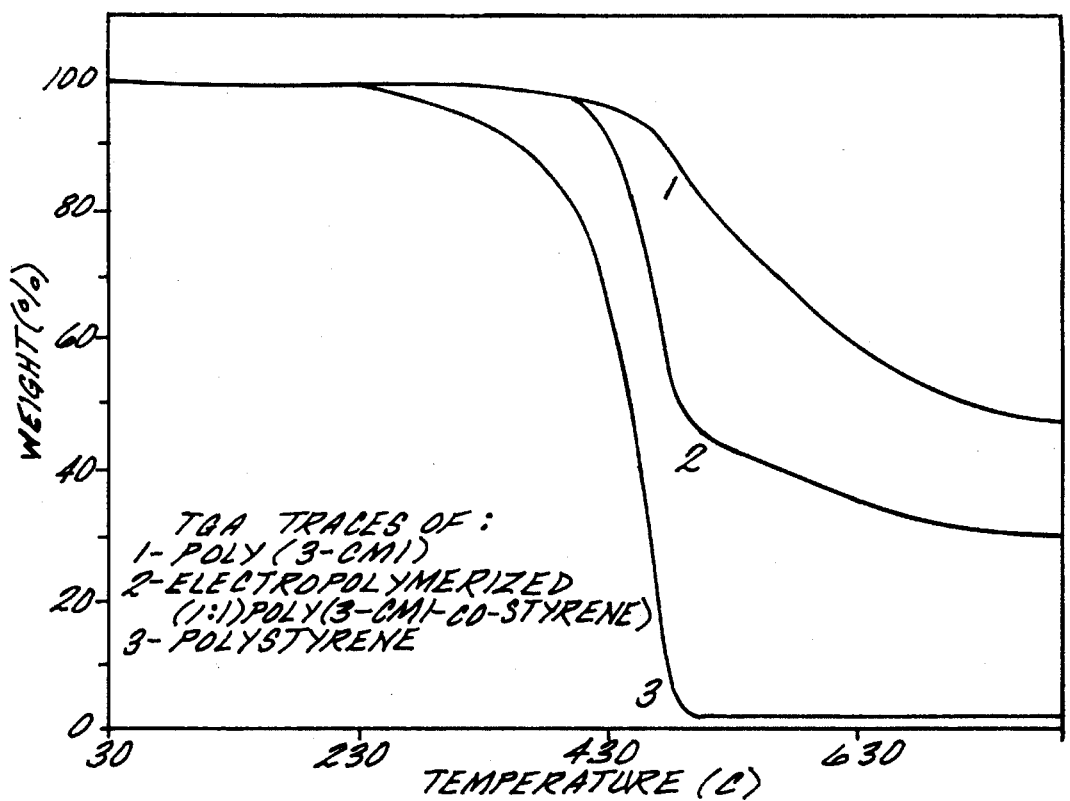
FIG. 5 are TGA traces of: (1) poly(3-CMI), (2) electropolymerized (1:1) poly(3-CMI-co-Styrene), (3) polystyrene.

Thermogravimetric analysis thermograms of solution cast polystyrene, bulk polymerized 3-CMI, and the electropolymerized (1:1) copolymer are shown on FIG. 5. These thermograms shown the electrocopolymers as having thermal stability intermediate between bulk homopolymerized poly-3-CMI and polystyrene. As expected, the data further shows that the thermal stability of the copolymers does not vary appreciably with changing monomer feed composition (Table 2). The electrocopolymerized samples demonstrate equivalent stability to the more stable epoxy resin systems and state-of-the-art formulated poly(bismaleimides).

The impact strength measured per cross sectional area at notch section is shown in Table 3. The high impact strength of the composite, 210 KJ/m² is attributed to the characteristic toughness of the thermoplastic matrix which prevented catastrophic breakage of the composites.

The interlaminar shear strength of the composites is also shown in Table 3. Moderate to good short beam shear strength of about 60 MPa was obtained for the samples. These are comparable to epoxy resin controls.

TABLE 1

GLASS TRANSITION TEMPERATURE OF STYRENE/3-CMI (SMAB) COPOLYMERS

| Sample | Mole % styrene (feed) | Tg (°C.) |
|---|---|---|
| SMAB-1 | 40 | 216 |
| SMAB-2 | 50 | 210 |
| SMAB-3 | 60 | 223 |
| SMAB-4 | 67 | 222 |
| SMAB-5 | 70 | 195 |
| SMAB-6 | 82 | 206 |
| SMAB-7 | 94 | 196 |
| Polystyrene | 100 | 100 |

TABLE 2

THERMAL STABILITY OF COPOLYMERS FROM THERMOGRAVIMETRIC ANALYSIS IN NITROGEN

| Feed (mol % styrene) | Initial Decomp. | Final Decomp. |
|---|---|---|
| 20 | 432 | 511 |
| 30 | 435 | 519 |
| 50 | 431 | 519 |
| 60 | 432 | 525 |
| 70 | 409 | 526 |
| 80 | 426 | 521 |

TABLE 3

MECHANICAL PROPERTIES OF THE COMPOSITES

| Comonomer Feed Ratio (3-CMI/Styrene) % | Impact Strength KJ/m² | Interlaminar Shear Strength MPa |
|---|---|---|
| 30/70 | 213 | 60 |
| 40/60 | 228 | 56 |
| 50/50 | 237 | 53 |
| 60/40 | 192 | 63 |
| 70/30 | 219 | 59 |

Effect of Reaction Conditions

Figure 6:
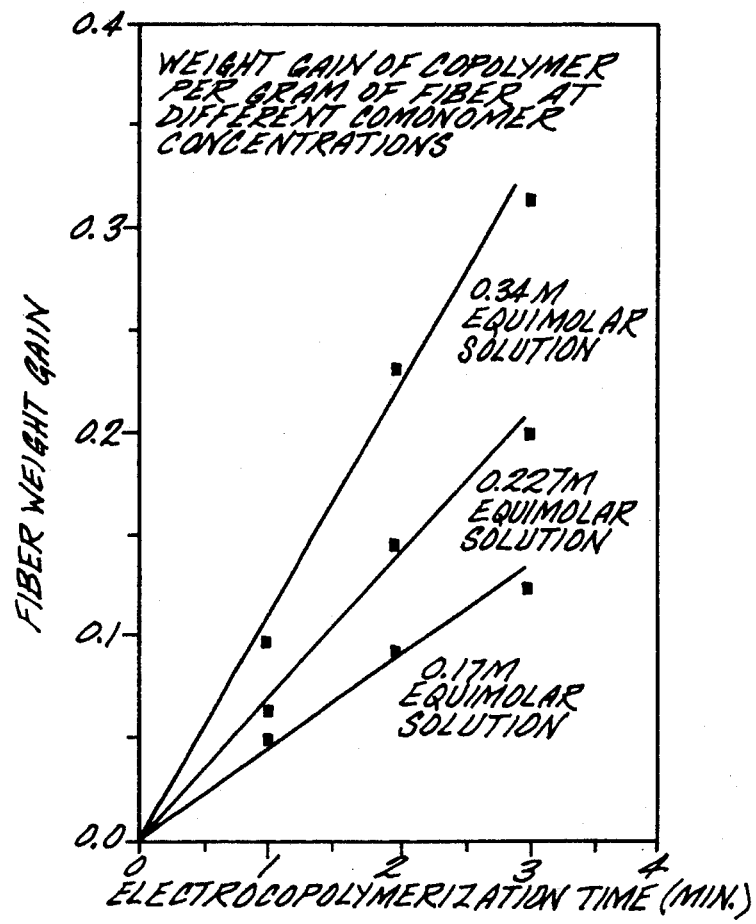
FIG. 6 is a graph showing weight gain of copolymer per gram of fiber at different comonomer concentrations.
Figure 7:
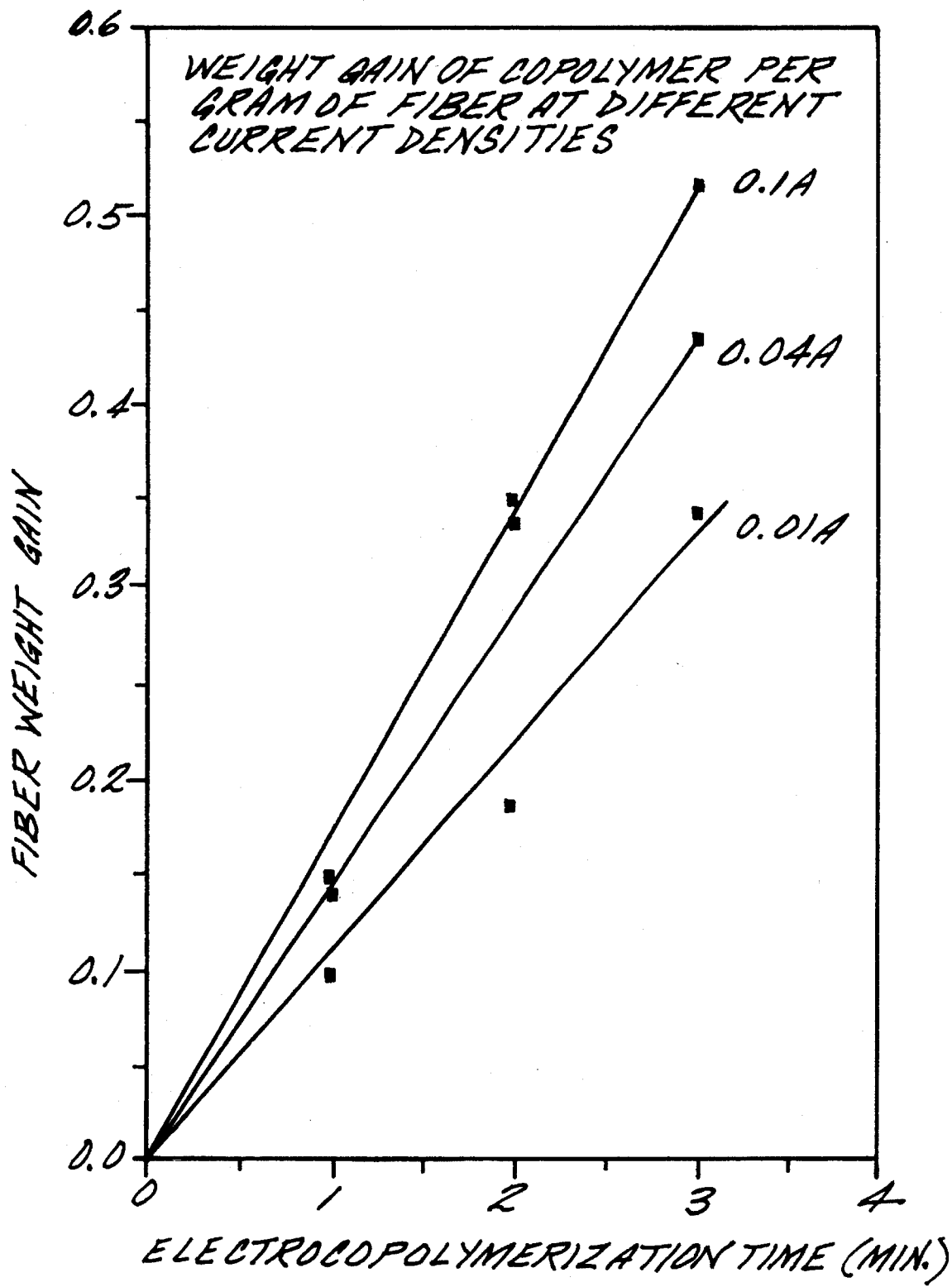
FIG. 7 is a graph showing weight gain of copolymer per gram of fiber at different current densities.

The amount of copolymer coating was studied as a function of current density, time, comonomer concentration and comonomer feed composition. A strong dependence of the amount of copolymer formed on the initial comonomer concentration as a function of time is shown in FIG. 6. In the same manner, the quantity of copolymer coatings formed on the fiber as a function of time at fixed initial comonomer concentration increases with increasing current density (FIG. 7). Variations of comonomer feed composition were found to have no significant effect upon the rate of copolymer formation. As is clear from FIGS. 6 and 7, the weight of the copolymer formed on the electrode increased linearly with time of polymerization. By changing the concentration of the comonomers, but maintaining the same comonomer feed composition the weight gain can be varied. A weight gain of about 30–40% of the copolymer per unit weight of the fiber was obtained (approximately 3 micron thick coating was used for composite fabrication; this corresponded to about 60 volume percent fibers in the final composite).

The foregoing Example 1 thus demonstrated a process of forming thick thermoplastic poly-3-carboxylphenylmaleimide-co-styrene matrices onto graphite fibers by electrochemical copolymerization. The glass transition temperature and the thermal decomposition temperature as well as the electropolymerizability of the copolymers were relatively the same for different comonomer feed composition, implying alternating copolymer structure. This is consistent with solution copolymerization data. The composite panels showed very good impact strength (approximately 210 KJ/m2). The short beam shear strength (approximately 60 MPa) was comparable to epoxy/graphite controls.

EXAMPLE 2

While the styrene/maleimide data of Example 1 was based on a batch electropolymerization system, the following Example 2 describes the electropolymerization of a glycidyl acrylate/methyl acrylate copolymer composite from a continuous process.

Experimental

Methyl acrylate, glycidyl acrylate, and sulfuric acid were prepared and a continuous electropolymerization process was set up as described in Bell et al, *Polymer Composites* 8 (1), 46–52 (1987). The comonomer system, of 2 liters, contained 0.25M Methyl Acrylate, 0.064M Glycidyl Acrylate, and 0.025M Sulfuric Acid in water.

Two anodes (titanium oxide coated with indium oxide; Area 2 ×200 cm²) were used as counter electrodes, and a roving of AS-4 (Hercules Fibers Co., 3000 filaments) graphite fiber, with approximately 36 cm in the solution, was used as the working electrode; i.e., the cathode.

After removing oxygen from the monomer solution by purging with nitrogen for 30 min, polymerization was started by applying a constant direct current. The weight gain on the graphite fibers as they passed through the bath was measured by the method of thermal gravimetric analysis (TGA).

Results

Figure 8:
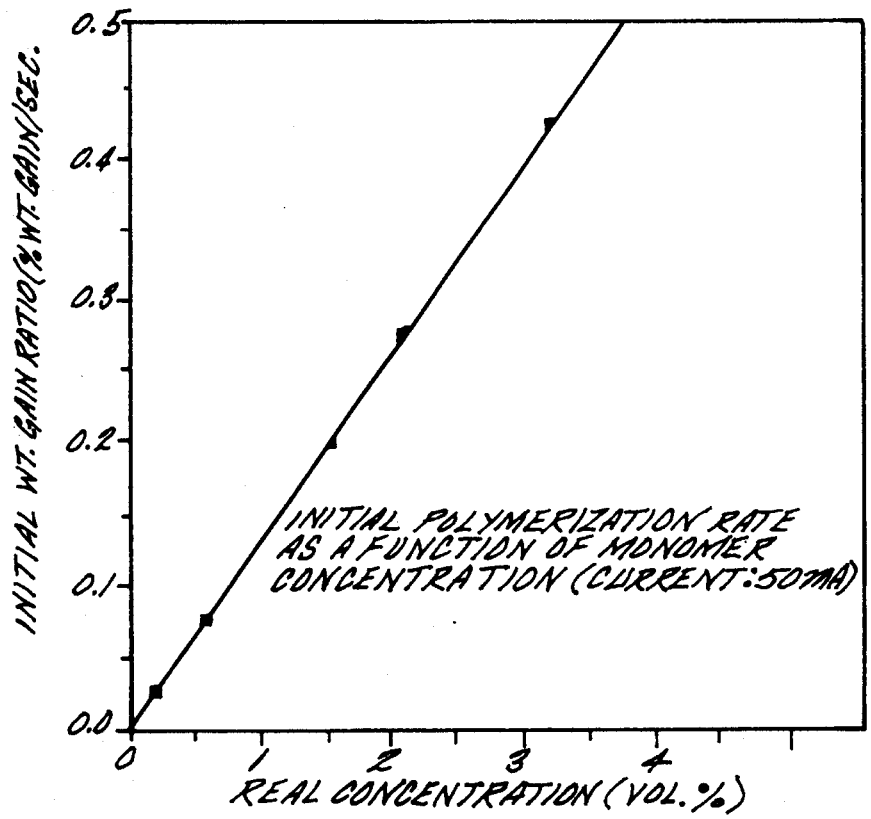
FIG. 8 is a graph showing polymerization rate as a function of monomer concentration for glycidyl acrylate/methyl acrylate (GA/MA) copolymers.

The effect of solution monomer concentration on initial polymerization rate (first 30 seconds) is shown in FIG. 8 for 50 milliamperes cell current. The linear plot is consistent with solution free radical polymerization theory, in which $R_p$, the rate of polymerization, is roughly proportional to monomer concentration.

Figure 9:
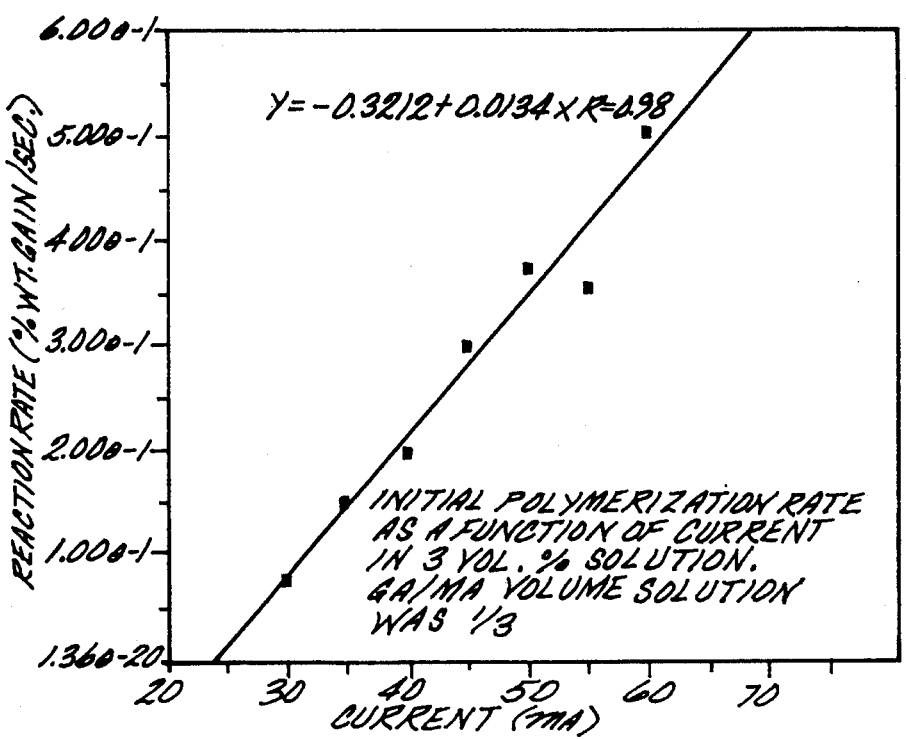
FIG. 9 is a graph showing polymerization rate as a function of current for GA/MA copolymers.

The effect of cell current on the initial polymerization rate is shown in FIG. 9. Linearity is again observed. The data are for a monomer solution containing 3 vol. % monomers, 1/3 GA/MA volume ratio. It will be appreciated that at longer polymerization time (i.e. 50–300 sec), linearity disappears. Diffusion begins to play a greater role as the coating becomes thicker, though monomer concentration remained constant.

From these observations:

$$R_p = K [m][A]$$

for the initial rate of polymerization, where Rp is the rate of polymerization, % wt gain/sec; [m] is the monomer concentration, and [A] is the cell current in milliamperes.

At longer reaction times it was found that $Rp = K'[m][time]^{-0.4}$ where K' is another constant.

EXAMPLES 3–13

A variety of other monomers and co-monomers have been electropolymerized using a batch process similar to that described in Example 1. The monomers utilized are described in Table 4 while the results of these electropolymerizations are summarized in Table 5.

TABLE 4

| Monomer | | Structure |
|---|---|---|
| A | Hydroxymethyl-Methacrylate | $H_2C=C(CH_3)C(=O)OC_2H_4OH$ |
| B | Vinyl Carbazole | $H_2C=CH$-N(carbazole) |
| C | Maleimide | (maleimide, N–H) |
| D | N-ethylmaleimide | (maleimide, N–$C_2H_5$) |
| E | Substituted N-Phenyl Maleimide | (N-phenyl maleimide, where R = COOH) |
| F | Styrene | $CH_2=CH$-phenyl |

TABLE 5

| Example | Monomers | Nature | Tg(°C.) | $T_{ID}$(°C.) |
|---|---|---|---|---|
| 3 | A | — | 115 | ~350 |
| 4 | B | — | 245 | ≧450 |
| 5 | C | — | ≧259 | ≧450 |
| 6 | D | — | ≦200 | ≧400 |
| 7 | E | — | ≧259 | ≧450 |
| 8 | F | — | 100 | ≧350 |
| 9 | A & B | Block | Range | |
| 10 | A & E | Block/Random | 150–175 | |
| 11 | C & F | Alternating | ≧220 | |
| 12 | D & F | Alternating/random | ≧160 | |
| 13 | E & F | Alternating | ≧200 | |

All of the copolymers of Examples 9–13 provide excellent electropolymerization results with comonomers A and F greatly facilitating the reaction. Of the monomer Examples 3–8, Example 3 exhibited the best performance in terms of the rate and overall thickness of the layer formed. The remaining monomers reacted more slowly with the monomers of Examples 5 and 7 forming a powdery layer. It will be appreciated that $T_{ID}$ indicates the temperature of initial decomposition.

While sulfuric acid is the preferred electrolyte used in the 3-CMI/styrene system of Example 1, as mentioned, other electrolytes may be used depending on the thermoplastic system being polymerized onto the conductive material.

In monomer E of Table 4, R may also equal methyl or other alkyl, ester, C N, $NO_2$, alkylaryl or an aryl group.

While the prepreg made in accordance with the present invention is primarily composed of a thermoplastic, preferably the prepreg includes a small amount of cross-linkable (e.g. bifunctional) thermoset resin. In this way, during the final high temperature molding step, some limited crosslinking is effected in the final composite.

Another embodiment of the present invention relates to a polymer matrix composite wherein the polymer matrix includes at least one cyclic N-substituted methacrylamide derivative monomer electropolymerized and fused onto electrically conductive filler material. The monomer for use in the present invention has the formula:

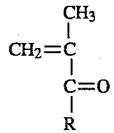

where R results in the molecule being a cyclic N-substituted methacrylamide derivative such as phenylmethacrylamide, 2-carboxyphenylmethacrylamide, and 4-carboxyphenylmethacrylamide (with the structures being shown in TABLE 8). Additional cyclic N-substituted methacrylamide derivatives suitable for this invention are identified in TABLE 6. Preferably, R is an aromatic constituent and more preferably includes a phenyl group. The present invention may comprise a homopolymer or a copolymer and may include other comonomers in addition to N-substituted methacrylamide monomers. Preferred comonomers include bulky constituent groups such as methyl methacrylate and its derivatives which provide spacing for the N-substituted methacrylamide monomers. Preferred examples of such methyl methacrylate derivative comonomers are set forth in TABLE 7.

Examples of polymers successfully synthesized using the electropolymerization technique of this invention are set forth in TABLE 8. In general, the polymer of this invention has the formula:

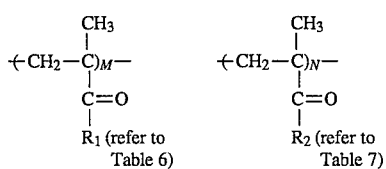

where M and N are typically on the order of 40 to 1000 (and preferably 300 to 600).

As mentioned, the cyclic N-substituted methacrylamide derivative monomers are electropolymerized onto any suitable

TABLE 6

CYCLIC N-SUBSTITUTED METHACRYLAMIDE DERIVATIVES

| COMPOUND NUMBER | CHEMICAL STRUCTURE | CHEMICAL NAME |
|---|---|---|
| 1 | —NH—⟨C₆H₄⟩—CH₂COOH | N-Methacrylyoyl-p-aminophenylacetic acid |
| 2 | —NH—⟨C₆H₃⟩(HOOC)(COOH) | N-methacryloyl-3-aminophthalic acid |
| 3 | —NH—⟨C₆H₃⟩(COOH)(COOH) | N-methacryloyl-5-aminophthalic acid |
| 4 | —NH—CHCOOH(C₆H₅) | N-methacryloyl-DL-2-phenyl glycine |
| 5 | —NH—CHCOOH(CH₂—C₆H₅) | N-methacryloyl-DL-phenylalanine |
| 6 | —NH—CHCH₂COOH(C₆H₅) | N-methacryloyl-DL-3-amino-3-phenyl propionic acid |
| 7 | —N(CH₃)—⟨C₆H₄⟩—COOH | N-methacryloyl-N-methyl anthranilic acid |
| 8 | —N(C₆H₅)—⟨C₆H₄⟩—COOH | N-methacryloyl-N-phenyl anthranilic acid |

TABLE 6-continued

CYCLIC N-SUBSTITUTED METHACRYLAMIDE DERIVATIVES

| COMPOUND NUMBER | CHEMICAL STRUCTURE | CHEMICAL NAME |
|---|---|---|
| 9 | | N-methacryloyl-N-phenyl glycine |
| 10 | | N-methcryloyl 4-aminosalicyclic acid |
| 11 | | N-methacryloyl 4-aminosalicyclic acid |
| 12 | | N-(4-hydroxyphenyl)methacrylamide |
| 13 | | N-adimantanyl-methacrylamide |
| 14 | | N-phthalimidemethyl-methacrylamide |
| 15 | | N-triphenylmethyl methacrylamide |

TABLE 7

METHYL METHACRYLATE DERIVATIVES

| COMPOUND NUMBER | CHEMICAL STRUCTURE | CHEMICAL NAME |
|---|---|---|
| 1 | | cyclohexyl methacrylate |
| 2 | | isobornyl methacrylate |

TABLE 7-continued
METHYL METHACRYLATE DERIVATIVES

| COMPOUND NUMBER | CHEMICAL STRUCTURE | CHEMICAL NAME |
| --- | --- | --- |
| 3 | —O—C₆H₃(CH₃)—COOH (structure) | methacryloylbenzoic acid |
| 4 | —O—C₆H₄—O—C(=O)—C₆H₄—O—C₆H₁₃ (structure) | 4-(p-hexyloxybenzoyloxy) phenyl methacrylate |
| 5 | —O—C₆H₄—C₆H₅ (structure) | 4-biphenyl methacrylate |

TABLE 8
ELECTROPOLYMERIZED POLYMER SYSTEMS IN ACCORDANCE WITH THIS INVENTION phenylmethacrylamide/

2-carboxyphenylmethacrylamide homopolymer (2-CPM polymer)

4-carboxyphenylmethacrylamide homopolymer (4-CPM polymer)

2-carboxyphenylmethacrylamide/ methylmethacrylate copolymer (2-CPM/MMA copolymer)

4-carboxyphenylmethacrylamide/ methylmethcrylate copolymer (4-CPM/MMA copolymer)

electrically conductive material including but not limited to graphite or metal plates, rods, fibers, particles, film, metal or graphite coated fibers or woven or non-woven conductive webs.

The electropolymerization processing technique used to form the polymer composites of this invention is essentially the same as the electropolymerization methodology disclosed with regard to the embodiment of FIGS. 1–9.

The N-substituted methacryamide derivative polymer embodiment of the present invention will now be more particularly described with respect to the following non-limiting examples.

EXPERIMENTAL 2- and 4-carboxyphenylmethacrylamide (2-CPM and 4-CPM) were synthesized by condensation of methacryloyl chloride (from Monomer & Polymer Lab, Inc.) with 2- or 4-aminobenzoic acid (from Aldrich Chemical Co.) following a procedure published by Kishore Patel, Trushar Desai and Bhikhu Sutar., Makromol. Chem. 186, 1151–1156 (1985). The melting point was 177° C. for 2-CPM and 227° for 4-CPM. Phenylmethacrylamide (PM) and phenylmaleimide (PMI) (from Monomer & Polymer Lab, Inc.) were used as received. Methyl methacrylate (MMA) was distilled under reduced pressure and kept cold.

Electropolymerization was done as described with regard to the embodiment of FIGS. 1–9: AS-4 graphite fiber bundle (from Hercules, Inc.) was wound onto an aluminum H-frame and was put into a central chamber of a three compartment cell. This central chamber contains monomer and sulfuric acid electrolyte dissolved in dimethylacetamide and water solution. The reaction was controlled by passing a constant current of 30 mA per gram of fiber using the graphite fiber as cathode and metal anode (titanium oxide coated with indium oxide). Electropolymerization time varied from 20 mins to 7 hours until a weight gain of 35% (67% fiber volume fraction) was attained. The weight gain on graphite fibers was obtained by weighing the sample after drying for two hours at 250° C. in vacuum. Unidirectional composites with 24 plies were fabricated from dried prepregs by compression molding at 280° C. and pressure of 5.6 kg/cm² for 1.5 hours.

CHARACTERIZATION

The glass transition temperatures (Tg's) of composites were obtained by the Dynamic Mechanical Analysis (DMA) using the polymer Lab DMTA at 1 Hz and heating rate of 5° C./min. Thermal stability was characterized by Perkin-Elmer TGA at a heating rate of 40° C./min under a nitrogen environment. NMR spectra of the CPM/MMA copolymers were taken in DMSO-$d_6$ solution on a Bruker AC-270 spectrometer operating at 270 MHz. Tetramethylsilane (TMS) was used as an internal standard. The CPM/MMA copolymer composition of each sample was also calculated from NMR spectroscopy by following a procedure published by A. F. Shaaban, A. A. Khalil, J. Applied Polymer Science, Vol. 37, 2051–2058 (1989). The apparent interlaminar shear strength of these unidirectional composites were determined by the short beam method ASTM 2344, with a span to depth ratio 4/1. The notched Izod impact resistance was tested by ASTM 256.

The thermal treatment of each NaCl rectangular disk (8mm× 8mm) coated with polymer thin film for IR study was done by putting the disk into a DuPont DSC cell, under controlled temperature and nitrogen environment, for a presetting time. The reaction conversion or the percentage of amide II consumption was calculated using the equation:

$$\text{amide reacted (\%)} = \frac{\frac{A(1)}{A(2)}(t=o) - \frac{A(1)}{A(2)}}{\frac{A(1)}{A(2)}} \times 100\%$$

A(1)=absorbance of amide II peak at 1505–1524 $cm^{-1}$

A(2)=absorbance of aromatic reference at 1605 $cm^{-1}$

The gel fraction of the cured polymer was estimated by weighing after extraction by dimethylacetamide for 24 hrs in a Soxhlet extractor.

RESULTS

The chemical structures of electropolymerized N-substituted methacrylamide matrices which have been successfully deposited onto graphite fiber are shown in TABLE 8. Though all of them have bulky, stiff groups in each repeat unit, data from TABLE 9 shows that polymer weight gain and Tg are highly dependent on type of monomer or comonomer used. Due to the stiff side chain and considerable degree of hydrogen bonding between the amide and acid groups along the polymer chain, all of the polymers have Tg's above 200° C. A comparison of the selected reaction time and weight gain data (TABLE 9) shows that only the 2-carboxyphenylmethacrylamide/methylmethacrylate (2-CPM/MMA) and 4-carboxyphenylmethacrylamide/methylmethacrylate (4-CPM/MMA) copolymers were deposited at a high rate of polymerization. The criterion of obtaining a thick coating on graphite fiber is to require not only that the monomer polymerize rapidly but also require that the polymer formed on graphite fiber to swell sufficiently to allow monomer to diffuse easily through. In this way, the polymer coating can grow thicker in a short time. This may be the reason for the observed high rate of weight gain for 2-CPM and 4-CPM/MMA.

TABLE 9

| | REACTION CONDITION | | | | |
|---|---|---|---|---|---|
| MONOMER | MONOMER CONC. (MOLE/l) | CURRENT DENSITY Ma/G FIBER | REACTION TIME (Hr) | WT. GAIN (%) | Tg(°C.) |
| PM/PMI | 0.5 | 30 | 9 | 40 | 220[b] |
| 2-CPM | 0.5 | 30 | 7 | 40 | 250[c] |
| 4-CPM | 0.5 | 30 | 7 | 45 | 300[c] |
| 2-CPM/ MMA | 0.5 | 30 | 0.5 | 35 | 210[b] |
| 4-CPM/ MMA | 0.5 | 30 | 0.5 | 40 | 240[b] |

TABLE 9-continued

| | REACTION CONDITION | | | | |
|---|---|---|---|---|---|
| MONOMER | MONOMER CONC. (MOLE/l) | CURRENT DENSITY Ma/G FIBER | REACTION TIME (Hr) | WT. GAIN (%) | Tg(°C.) |

[a]35% weight gain approx. 67% fiber volume fraction calculated by using density of 1.8 g/cm$^3$ for fibers and density of 1.18 g/cm for matrices
[b]Tg depends on polymer composition:
0.45 mole fraction of PM in PM/MI copolymer (Tg approx. 220° C.)
0.5 mole fraction of 2-CPM in 2-CPM/MMA copolymer (Tg approx. 210° C.)
0.49 mole fraction of 4-CPM in 4-CPM/MMA copolymer (Tg approx. 240° C.)
[c]These values were attained after reheating the sample in DMTA Because of the ease of electropolymerization and high Tg, the CPM/MMA system was fabricated into composites. The properties are discussed below.

Examination of TGA curves of all these polymer samples indicate that there is a large weight loss around 400° C. indicative of its moderate thermal stability. The TGA data reveal that 4-CPM homopolymer shows a higher stability than 2-CPM homopolymer, the trend of thermal stability being 4-CPM> 2-CPM>4-CPM/MMA>2-CPM/MMA>PMMA.

Figure 10:
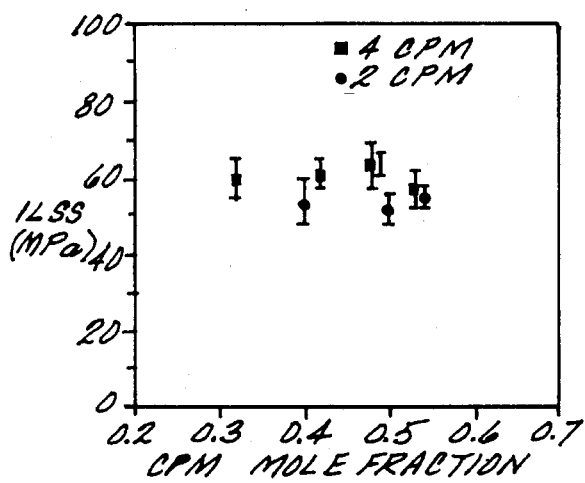
FIG. 10 is a graph of interlaminar shear strength of composites in accordance with the N-substituted methacrylamide derivative polymer embodiment of the present invention vs. matrix composition.
Figure 11:
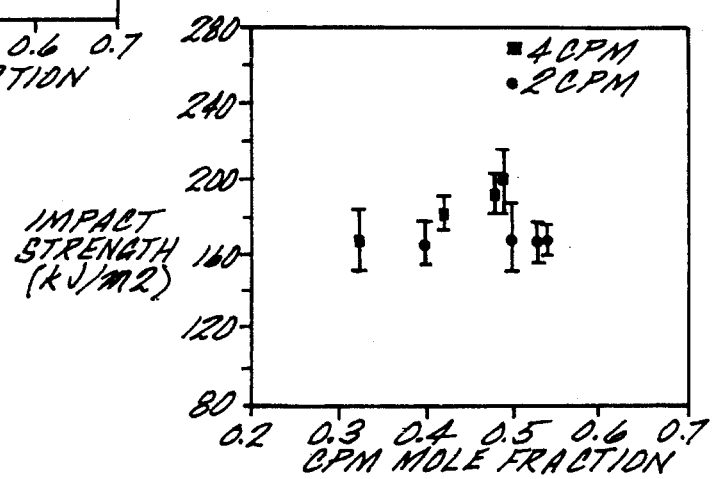
FIG. 11 is a graph of impact strength of composites in accordance with the N-substituted methacrylamide derivative polymer embodiment of the present invention vs. matrix composition.

FIG. 10 shows the interlaminar shear strength (ILSS) of 2-CPM/MMA and 4-CPM/MMA graphite composite as a function of polymer composition. As shown in FIG. 10, the ILSS of 2-CPM/MMA is slightly lower than for the 4-CPM/MMA (50 MPa as compared to 60 MPa for 4-CPM/MMA). This behaviour is possible due to a larger amount of intermolecular hydrogen bonding of 4-CPM/MMA. Within the selected composition range, the ILSS of both systems level out and do not change very much. The notched Izod impact strength data are displayed in FIG. 11. The impact strength of 4-CPM/MMA composites shows a slight increase over 2-CPM/MMA composites at the same composition; for example 200 KJ/m$^2$ vs 170 KJ/m$^2$ for $F_1$=0.5. During the test, the delamination failure modes of both 4-CPM/MMA and 2-CPM/MMA specimens were observed. All of the samples show a failure mode which was indicative of notch insensitivity. The short beam shear and impact strength measurements of FIGS. 10 and 11 indicate appreciably high impact strengths, approximately 180 KJ/m$^2$ for 4-CPM/MMA composite and 165 KJ/m$^2$ for 2-CPM/MMA composite. These values are significantly higher than 100 KJ/m$^2$ for a typical epoxy composite at 67% fiber volume fraction. The interlaminar shear strengths were both approximately 60 MPa (which is slightly lower than 80 MPa for typical epoxy composite at 67% fiber volume fraction).

Figure 12:
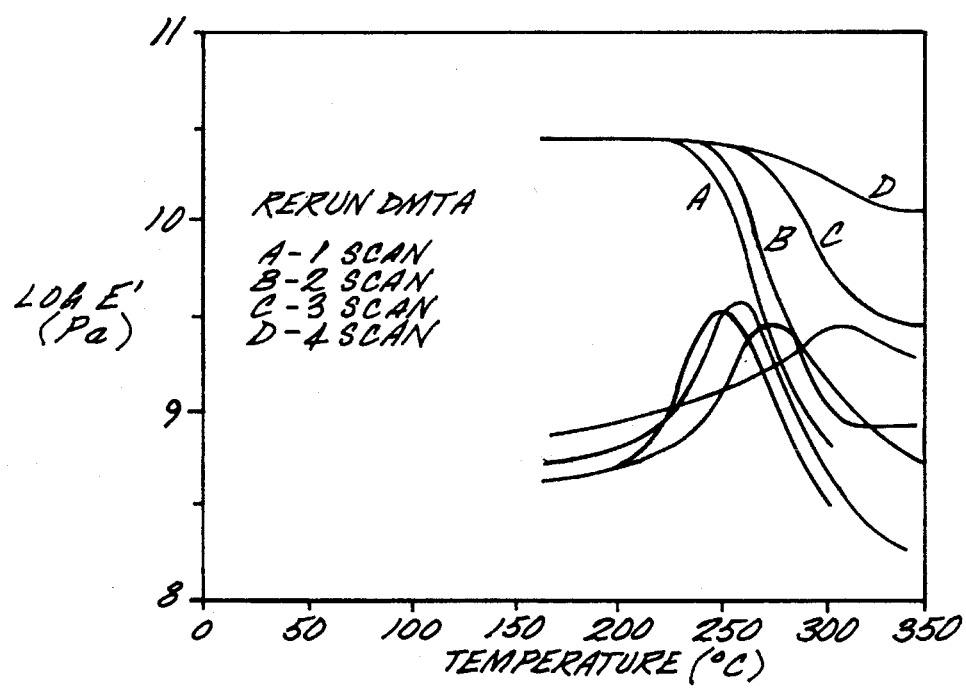
FIG. 12 is a dynamic mechanical analysis of 4-CPM composite in accordance with the present invention.
Figure 13A:
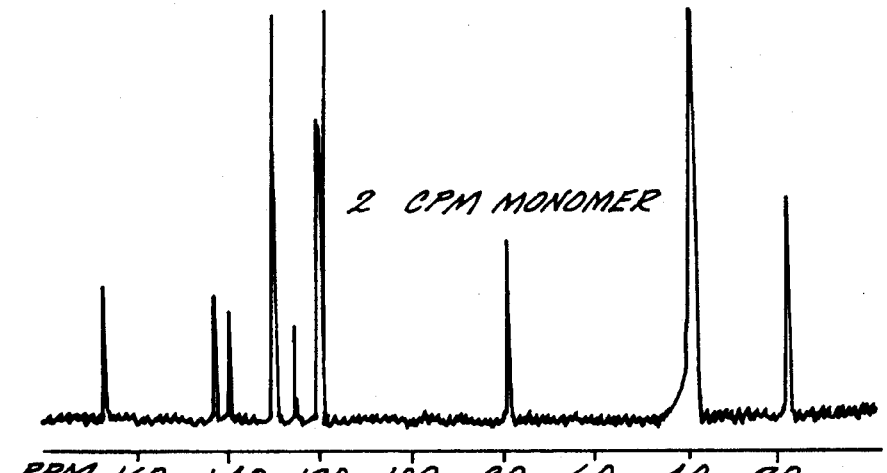
FIGS. 13A–D are NMR spectra for 2-CPM monomer, 2-CPM polymer, 2-CPM polymer heated at 250° C. for 60 minutes and diacetamide, respectively.
Figure 13B:
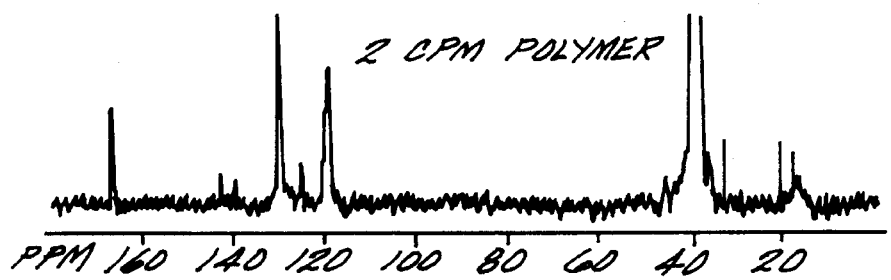
Figure 13C:
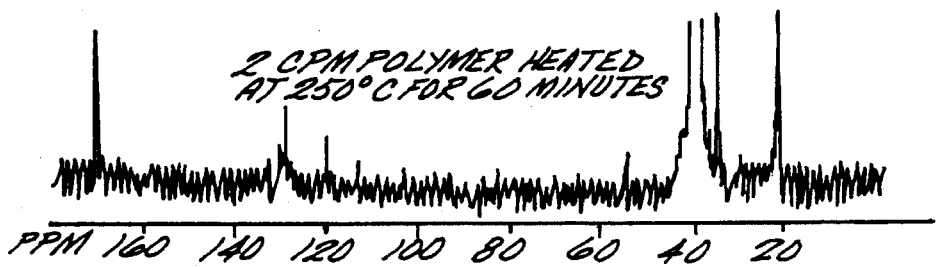
Figure 13D:
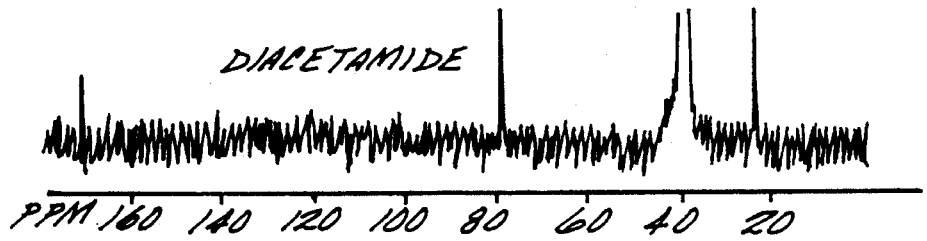

With reference now to FIG. 12, the Tg and storage Modulus at the rubbery plateau of the poly (4-carboxyphenylmethacrylamide) composite were both increased significantly after successively reheating to 350° C. in the DMTA cell. The same trend was also shown by the poly (2-carboxyphenylmethacrylamide) composite upon heating. For the latter, the change in the Tg and storage Modulus at the rubbery plateau is small after the first cycle. Supplemental results from reheating 2- and 4-CPM polymers in the DSC cell show the same characteristic trend as the DMTA data. Both of the DSC thermographs show an endothermic peak on the first scan. The thermal reaction between —CONH and —COOH groups is confirmed by NMR spectra (FIG. 13A–D). The carbonyl peaks of —CONH and COOH before curing are at 166 and 167 ppm, respectively (FIGS. 13A and 13B). Instead the carbonyl peak of the imide after heating at 250° C. for one hour is at 170 ppm, which is close to the 171 ppm for the imide peak of a diacetamide model compound (FIG. 13C and 13D).

Infrared spectra also support the reaction of carboxyl and amide groups to form imides. This is discussed first with regard to the monomer followed by a discussion of the polymer. It is shown that IR spectra of thermally treated 2-CPM monomer exhibits the 1760 cm$^{-1}$ and 1730 cm$^{-1}$ band, the former being lower in intensity. These two bands are not seen in the IR spectra of unheated 2-CPM monomer. The intensity of amide II at 1524 cm$^{-1}$ is also lower after heating. This is consistent with a thermal reaction between —CONH and —COOH groups. Obviously, the double bond of 2-CPM monomer will also start to polymerize and form 2-CPM polymer. That is why the IR spectra of thermally treated 2-CPM monomer is identical to that of thermally treated 2-CPM polymer.

Again, the 1760 cm$^{-1}$ and 1730 cm$^{-1}$ bands of thermal treated 2-CPM polymer are not shown in the IR spectra of 2-CPM polymer. By comparing the IR spectra of diacetamide, 2-CPM polymer and thermally treated 2-CPM polymer, the absorption peak at 1605 cm$^{-1}$ appears to be the aromatic carbon-carbon stretching vibration and the absorption near 1524 cm$^{-1}$ appears to be amide II. The ratio of these two bands will be used to determine the extent of thermal reaction between —CONH and —COOH groups.

Figure 14:
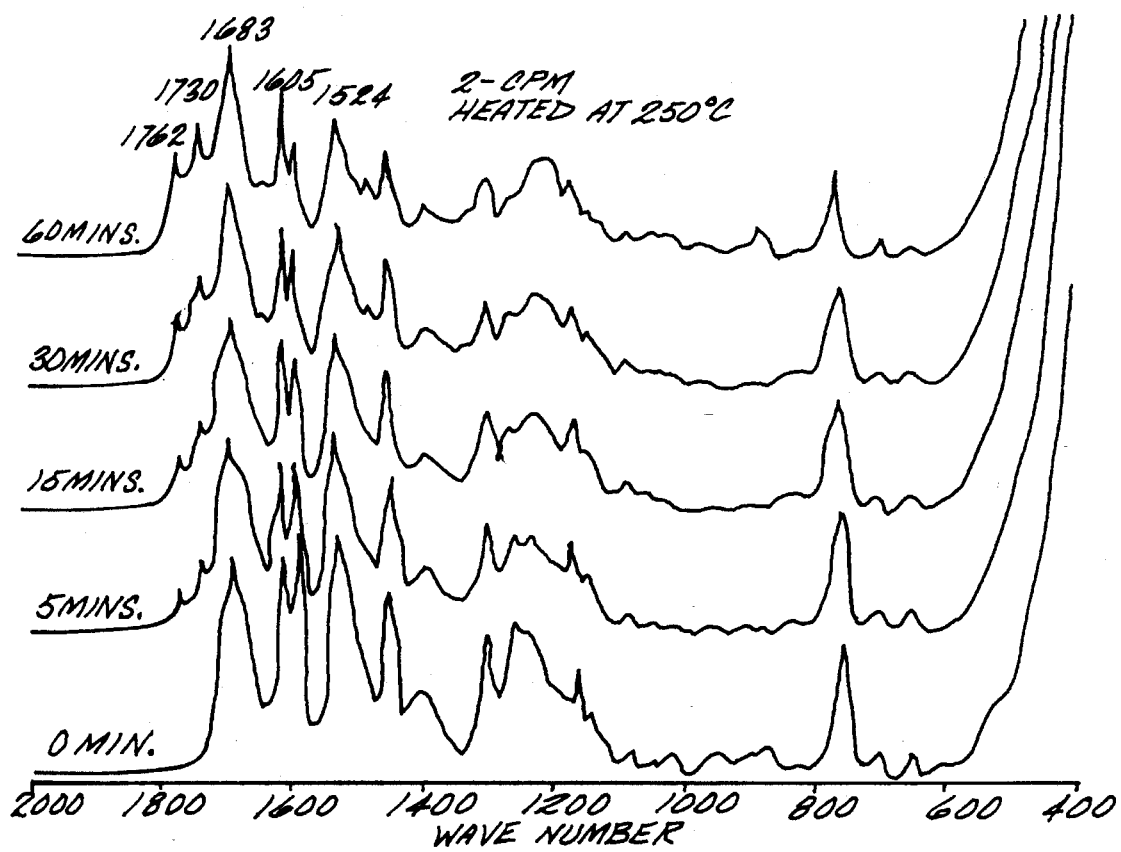
FIG. 14 is an IR spectra of 2-CPM polymer heated at 250° C. for various times.

The IR spectra of the 2-CPM polymer for different times of heating is shown in FIG. 14. In general, the IR spectra for the polymers of Table 3 all demonstrate the same characteristic absorption of imide between 1780–1710 CM$^{-1}$ and the consumption of amide II between 1525–1510 cm$^{-1}$. By comparing the IR spectra of the thermally treated 4-CPM polymer and 4-CPM/MMA copolymer, it seems that there is an additional thermal reaction occurring for 4-CPM/MMA copolymer. The absorption near 1805 cm$^{-1}$ may be the characteristic of an anhydride formed by the thermal reaction between —COOH and —COOH$_3$. The highest percentage of amide reacting during imidization of 2-CPM polymer is approximately 60%. On the contrary, the percentage of amide reacted for 4-CPM polymer is only approximately 40%, which is significantly lower than that of 2-CPM polymer. This large difference may be due to the closer proximity of the amide and acid groups in the 2-CPM polymer. No reaction occurred at the thermally treated polyphenylmethacrylamide model compound.

Figure 15:
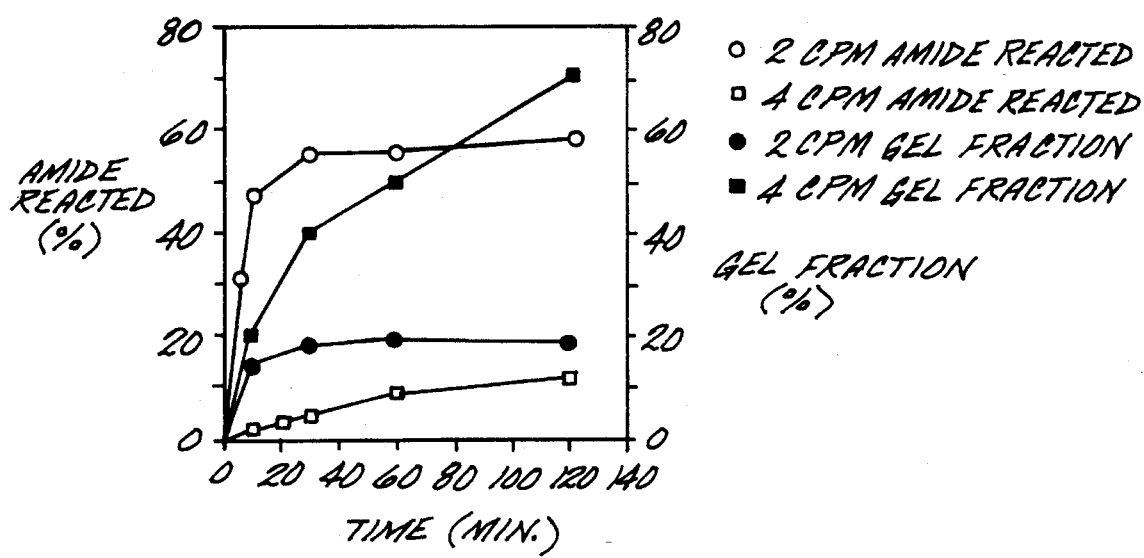
FIG. 15 is a graph depicting percentage of amide reacted and gel fraction vs. heating time at 280° C. for 2-CPM, and 4-CPM homopolymers.

FIG. 15 shows the plots of the amide reacted and gel fraction versus time after heating 2-CPM polymer and 4-CPM polymer at 280° C. From this plot, one notes that it takes a short time to reach the final imide conversion of 2-CPM polymer to the imide. Surprisingly, its gel fraction only goes up to approximate 20%. On the contrary, the gel content of the thermally treated 4-CPM polymer can go up to 60%, while amide consumption is only 20% after 2 hours.

It seems clear the the imide crosslinking is mostly intermolecular for 2-CPM polymer. Although the imidization of 2-CPM polymer has a lower activation energy and higher imidization yield upon heating, only a small amount of crosslinked network is formed, which contributes a minor increase in the gel fraction and Tg. On the contrary, the imidization of 4-CPM polymer upon heating brings about intermolecular crosslinking and network formation, which increases both the Tg and gel fraction. This reasoning also explains the different results upon repeat heating of the 2-CPM polymer and 4-CPM polymer in the dynamic mechanical analysis and DSC experiments.

The electropolymerized polymer composites of the present invention have many features and advantages, some of which have been discussed above. Two particularly important features include high Tg and the controllable degree of crosslinking. For example, the Tg of 4-carboxyphenyl methacrylamide and 2-carboxyphenyl methacrylamide homopolymers synthesized by electropolymerization in accordance with the present invention is significantly higher (after postcuring) than the published Tg value of the same polymers synthesized by thermally initiated polymerization (300° C. vs. 200° C. for 4-carboxyphenyl methacrylamide and 250° C. vs. 180° C. for 2-carboxyphenyl methacrylamide). The Tg of the 4-CPM/MMA copolymer can reach 270° C. Because of this, it is clear that composites using these polymer matrices will have greater strength at higher temperatures.

A second important feature of this invention arises from the fact that the monomers described herein have condensation-type pendant functional groups (e.g., —COOH, —NH, for 2-carboxyphenylmethacrylamide). Because of this, it is possible to produce a controlled degree of crosslinking which can prevent flow at high temperatures. The system operates such that this reaction occurs during the post-cure or post-fabrication stage of composite processing. As shown by the dynamic mechanical properties which indicate some crosslinking reaction has taken place in the polymer matrix, the Tg and storage modulus within the rubbery plateau region continuously increase after several heating and cooling runs. This behavior results from the curing reaction between the amide and the acid to form the imide. Because of this curing mechanism, the benefits of both the thermosetting and the thermoplastic systems may be obtained by controlling the degree of crosslinking.

In summary, a higher Tg, crosslinking, and reduced flow at high temperatures improve the performance of composites in accordance with this invention relative to the prior art.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A product made from the process of forming a thermoplastic matrix prepreg composite consisting essentially of the steps of:

electropolymerizing at least one carboxy group containing monomer onto electrically conductive filler material in a substantially aqueous solution having a monomer concentration and over a time period effective to form a coating of thermoplastic polymer matrix on said material, said coating having a thickness of greater than two microns or a thickness effective to provide at least about 30 weight percent of thermoplastic polymer coating per unit weight of conductive filler material, said aqueous solution including at least one organic solvent, said at least one monomer being moderately soluble in said organic solvent-containing aqueous solution and said at least one monomer being permeable to ions diffusing as a result of said electropolymerization step.

2. The product of claim 1 wherein:

said conductive material comprises graphite.

3. The product of claim 1 wherein:

said conductive material comprises at least one bundle of graphite fibers.

4. The product of claim 1 wherein:

said at least one carboxy group containing monomer is electropolymerized with styrene monomer such that said thermoplastic matrix comprises a co-polymer of styrene and 3-carboxyphenyl maleimide.

5. The product of claim 4 wherein:

said co-polymer has the structure of

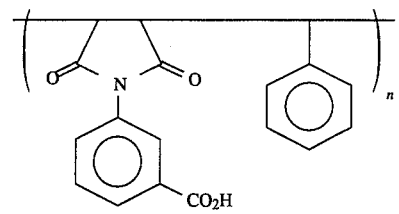

where n is at least 25.

6. The product of claim 2 wherein:

said at least one carboxy group containing monomer is electropolymerized with styrene monomer such that said thermoplastic matrix comprises a co-polymer of styrene and 3-carboxyphenyl maleimide.

7. The product of claim 6 wherein:

said co-polymer has the structure of

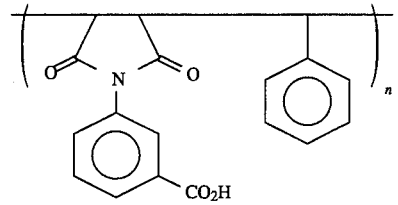

where n is at least 25.

8. The product of claim 1 wherein:

said at least one carboxy group containing monomer is electropolymerized with a different monomer such that said thermoplastic matrix is selected from the group consisting of a co-polymer of glycidyl acrylate and methyl acrylate, a copolymer of hydroxethyhnethacrylate and vinyl carbazole, a copolymer of hydroxethylmethacrylate and 3-carboxyphenyl maleimide, a copolymer of maleimide and styrene and a copolymer of N-ethylmaleimide and styrene.

9. The product of claim 1 wherein said organic solvent is selected from the group consisting of dimethylacetamide, dimethylsulfoxide, tetrahydrofuran or dimethylformamide.

10. The product of claim 1 wherein the themoplastic polymer coating exhibits a glass transition temperature of greater than 150° C.

11. The product of claim 1 wherein:
said electrically conductive filler material comprises a metal.

12. A composite including a co-polymer, the copolymer having the structure

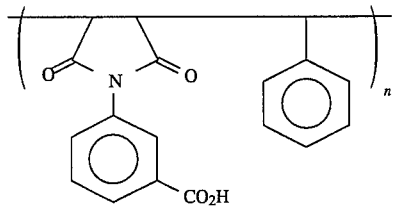

where n is at least 25; and
electrically conductive filler material, the copolymer being directly fused to aid filler material by an electropolymerization process.

13. The composite of claim 12 wherein:
said filler comprises graphite.

14. The composite of claim 13 wherein:
said filler comprises at least one bundle of graphite fibers.

15. The composite of claim 12 wherein:
said electrically conductive filler material comprises a metal.

16. The product of claim 2 wherein:
said at least one carboxy group containing monomer is electropolymerized with a different monomer such that said thermoplastic matrix is selected from the group consisting of a co-polymer of glycidyl acrylate and methyl acrylate, a copolymer of hydroxyethylemethacrylate and vinyl carbazole, a copolymer of hydroxethylmethacrylate and 3-carboxyphenyl maleimide, a copolymer of maleimide and styrene and a copolymer of N-ethylmaleimide and styrene.

17. The composite of claim 1 wherein:
said electrically conductive filler is at least one of the fillers selected from the group consisting of metal plates, metal rods, metal fibers, metal particles and metal coated fibers.

18. The composite of claim 1 wherein:
said electrically conductive filler is at least one of the fillers selected from the group consisting of graphite plates, graphite rods, graphite particles and graphite coated fibers.

19. The composite of claim 1 wherein:
said electrically conductive filler is at least one of the fillers selected from the group consisting of woven or non-woven conductive webs.

20. The composite of claim 12 wherein:
said electrically conductive filler is at least one of the fillers selected from the group consisting of metal plates, metal rods, metal fibers, metal particles and metal coated fibers.

21. The composite of claim 12 wherein:
said electrically conductive filler is at least one of the fillers selected from the group consisting of graphite plates, graphite rods, graphite particles and graphite coated fibers.

22. The composite of claim 12 wherein:
said electrically conductive filler is at least one of the fillers selected from the group consisting of woven or non-woven conductive webs.

* * * * *